May 10, 1927.
G. T. COOKE
SAFETY LOCK FOR BRAKE ROD PINS
Filed March 12, 1926
1,628,119
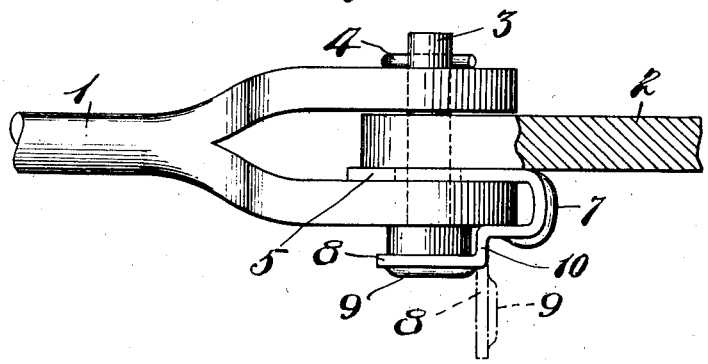
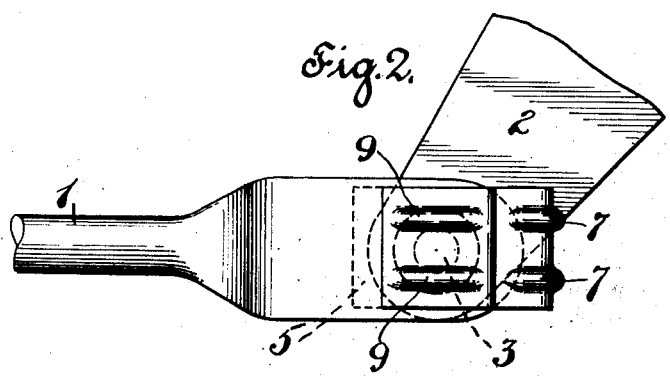
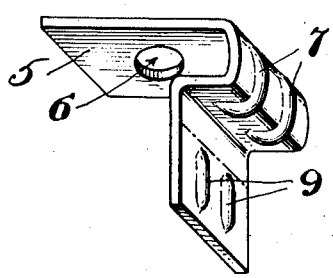
INVENTOR
George T. Cooke
BY
Mildred T Beckert
ATTORNEYS.

Patented May 10, 1927.

1,628,119

UNITED STATES PATENT OFFICE.

GEORGE THOMAS COOKE, OF NEW YORK, N. Y.

SAFETY LOCK FOR BRAKE-ROD PINS.

Application filed March 12, 1926. Serial No. 94,116.

This invention relates to safety locks for pivot bolts, pins, and the like, the invention being of particular utility when employed in connection with a pivot pin for holding a brake rod to a brake lever with which it is associated, the function of the invention being to hold the pin in operative position even though other means customarily employed should work loose and fall off.

The object of the invention is to provide an improved construction which is exceedingly simple and yet durable and effective.

In the accompanying drawing—

Fig. 1 is a plan view of the end of a brake rod and a brake lever, the said ends being secured together by a pin with my safety lock applied;

Fig. 2 is a side elevation of the same;

Fig. 3 is a perspective view of the lock alone before it is applied.

1 represents the forked end of a brake rod. 2 represents the end of a brake lever. These parts overlap and are perforated to receive a pivot pin 3, the same having a head at one end and ordinarily being provided with a cotter pin 4 at the other end to hold it in place. Owing to the great vibration to which such parts are subjected, it not infrequently happens that cotter pins wear off or work out, and to that end I provide improved means for holding the pivot pin in place even though this should occur. My improved means comprises a bendable sheet metal strip shaped in a particular way to facilitate ready application and to guarantee security and strength in use. This strip is bent so as to provide a base 5 having a pin passage 6. The strip, at one end of the base, is curved so as to form a recess closely approximating the thickness of one of the forked ends of the brake rod, and this bend is provided with one or more longitudinal corrugations 7—7, which very greatly stiffens the bend giving to it a resistance to bending that it would not otherwise possess. 8 is an upstanding flap at the end of the aforesaid bend and this flap is provided with one or more longitudinal corrugations 9—9. These corrugations are preferably spaced away from the lower end of the flap where it meets the bend a distance substantially equal to the thickness of the head of the pin 3, as plainly seen in the drawings. To apply this device, the base 5 is inserted between one of the forks of the brake rod 1 and the adjacent side of the brake lever 2, as shown in Fig. 2. The hole in the base 1 is then caused to register with the pin passages through the brake rod and lever. The pin 3 is then applied. It will be noted that the head of the pin, when fully in place, lies close to the base of the flap 8. The operator may then, by a hammer-blow, strike the end of the flap so as to cause the corrugated portion thereof to be bent down on top of the pin head making it impossible to remove the latter until the flap has been again bent back to its original position, indicated in dotted lines in Fig. 2. The bending down operation forms an offset shoulder 10. A cotter pin 4 may be applied to the pin in the usual manner, if desired. It will be noted that the corrugations in the main bend stiffen it to a very marked degree, thereby resisting any strain tending to open the lock. By this construction, any bending strain sufficient to open the lock will cause it to bend to the region of the offset shoulder 10, and since this offset shoulder is very close to the end of the flap, it requires very much greater force to bend the metal at that point (because of the short leverage afforded) than would be required to bend it at the end, but since the end is stiffened by corrugations, it follows that the metal will yield first in the region of the offset shoulder 10.

What I claim is:

1. As an article of manufacture, a safety retainer for pivot pins and the like for brake rods, comprising a bendable metal strip perforated at one end to form a pin passage, and a U-shaped bend intermediate the length of said strip for fitting snugly over the brake rod, the other end of said strip being bent outwardly to form an offset shoulder, the outer portion of said offset shoulder being bendable to form a retainer for the outer end of the pin.

2. As an article of manufacture, a safety retainer for pivot pins and the like for brake rods, comprising a bendable metal strip perforated at one end to form a pin passage, a U-shaped bend intermediate the length of said strip for fitting snugly over the brake rod, the other end of said strip being bent outwardly to form an offset shoulder, the outer portion of said offset shoulder being bendable to form a retainer for the outer end of the pin, a longitudinal corrugation in said strip around said U-shaped bend to reinforce the same, and a corrugation in that part of the strip forming the pin head retaining shoulder.

GEORGE THOMAS COOKE.